United States Patent
Rhodes et al.

(10) Patent No.: US 6,962,384 B2
(45) Date of Patent: Nov. 8, 2005

(54) FOLD FLAT MOTOR VEHICLE SEAT

(75) Inventors: Louis A Rhodes, Farmington Hills, MI (US); Douglas J Quigley, Rochester, MI (US); Joseph L Salani, Oxford, MI (US); Carl Mather, Lake Orion, MI (US); John V Keane, Auburn Hills, MI (US); David J Ewers, Leonard, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/646,016

(22) Filed: Aug. 22, 2003

(65) Prior Publication Data
US 2004/0100116 A1 May 27, 2004

Related U.S. Application Data

(60) Provisional application No. 60/405,453, filed on Aug. 23, 2002.

(51) Int. Cl.[7] ............................. B60N 2/04; B60N 2/14
(52) U.S. Cl. .................. 296/66; 296/65.11; 296/65.13
(58) Field of Search ........................ 296/63, 64, 65.01, 296/66, 65.02, 65.05, 65.11, 65.13, 65.16

(56) References Cited

U.S. PATENT DOCUMENTS

| | | | |
|---|---|---|---|
| 847,707 A | 3/1907 | Spindler | |
| 1,887,947 A * | 11/1932 | Savale | 297/15 |
| 4,005,902 A | 2/1977 | Balin | |
| 4,699,418 A | 10/1987 | Plavetich | |
| 4,846,520 A * | 7/1989 | Acuto et al. | 296/65.09 |
| 4,925,228 A * | 5/1990 | Pipon et al. | 296/65.06 |
| 5,038,437 A | 8/1991 | Russell et al. | |
| 5,195,795 A | 3/1993 | Cannera et al. | |
| 5,269,581 A | 12/1993 | Odagaki et al. | |
| 5,482,349 A | 1/1996 | Richter et al. | |
| 5,492,386 A | 2/1996 | Callum | |
| 5,527,087 A | 6/1996 | Takeda et al. | |
| 5,570,931 A | 11/1996 | Kargilis et al. | |
| 5,839,773 A | 11/1998 | Ban et al. | |
| 5,868,451 A * | 2/1999 | Uno et al. | 296/66 |
| 5,871,255 A | 2/1999 | Harland et al. | |
| 5,890,758 A | 4/1999 | Pone et al. | |
| 5,927,789 A * | 7/1999 | Mezzadri et al. | 296/64 |
| 5,975,612 A | 11/1999 | Macy et al. | |
| 5,979,964 A | 11/1999 | Ban et al. | |
| 6,000,751 A | 12/1999 | Kato et al. | |
| 6,089,641 A | 7/2000 | Mattarella et al. | |
| 6,106,046 A | 8/2000 | Reichel | |
| 6,123,380 A | 9/2000 | Sturt et al. | |
| 6,129,404 A | 10/2000 | Mattarella et al. | |
| 6,129,405 A * | 10/2000 | Miyahara et al. | 296/65.11 |
| 6,193,317 B1 | 2/2001 | Mitschelen et al. | |
| 6,231,101 B1 | 5/2001 | Kamida et al. | |
| 6,234,553 B1 | 5/2001 | Eschelbach et al. | |

(Continued)

FOREIGN PATENT DOCUMENTS

EP  000120817  * 10/1984  ............... 296/65.05

(Continued)

Primary Examiner—H. Gutman
(74) Attorney, Agent, or Firm—Ralph E. Smith

(57) ABSTRACT

A seat assembly for a motor vehicle includes a seat cushion translatable on at least one track to a position generally above a tub disposed at least partially in a floor of the vehicle. The seat cushion is stowable in the tub.

10 Claims, 4 Drawing Sheets

U.S. PATENT DOCUMENTS

| | | | |
|---|---|---|---|
| 6,270,140 B1 * | 8/2001 | Opfer et al. | 296/65.03 |
| 6,279,982 B1 * | 8/2001 | Nishimura et al. | 296/65.09 |
| 6,332,650 B1 | 12/2001 | Krist et al. | |
| 6,352,310 B1 | 3/2002 | Schmidt et al. | |
| 6,371,559 B1 | 4/2002 | Kienzle et al. | |
| 6,398,307 B1 | 6/2002 | Schmidt et al. | |
| 6,406,084 B1 | 6/2002 | De Campos et al. | |
| 6,416,107 B1 | 7/2002 | Kanaguchi et al. | |
| 6,425,619 B2 | 7/2002 | Ney | |
| 6,435,590 B2 * | 8/2002 | Miyahara et al. | 296/65.11 |
| 6,464,279 B1 | 10/2002 | Schambre et al. | |
| 6,609,745 B2 * | 8/2003 | Miyahara et al. | 296/65.11 |
| 6,629,721 B1 * | 10/2003 | Macey | 297/15 |
| 6,644,730 B2 | 11/2003 | Sugiura et al. | |
| 6,648,393 B1 * | 11/2003 | Milnar et al. | 296/65.11 |
| 6,682,120 B2 | 1/2004 | Kamida et al. | |
| 6,688,666 B2 | 2/2004 | Neale et al. | |
| 6,705,658 B2 | 3/2004 | Jach et al. | |
| 2001/0002759 A1 | 6/2001 | Nishide | |
| 2001/0054835 A1 | 12/2001 | Feng | |
| 2003/0094830 A1 | 5/2003 | Kamida et al. | |

FOREIGN PATENT DOCUMENTS

| | | | | |
|---|---|---|---|---|
| FR | 002575708 | * | 7/1986 | 296/65.05 |
| FR | 2735081 | * | 12/1996 | |
| FR | 2735081 A1 | * | 12/1996 | B60N 2/04 |
| JP | 363227435 | * | 9/1988 | 296/65.05 |
| JP | 401095947 | * | 4/1989 | 296/63 |
| JP | 411005477 | * | 1/1999 | |
| JP | 2003094997 | * | 4/2003 | |
| JP | 2003212017 | * | 7/2003 | |
| JP | 3507480 | * | 3/2004 | |
| KR | 98057165 | * | 9/1998 | |
| WO | WO02/14104 | | 2/2002 | |

* cited by examiner

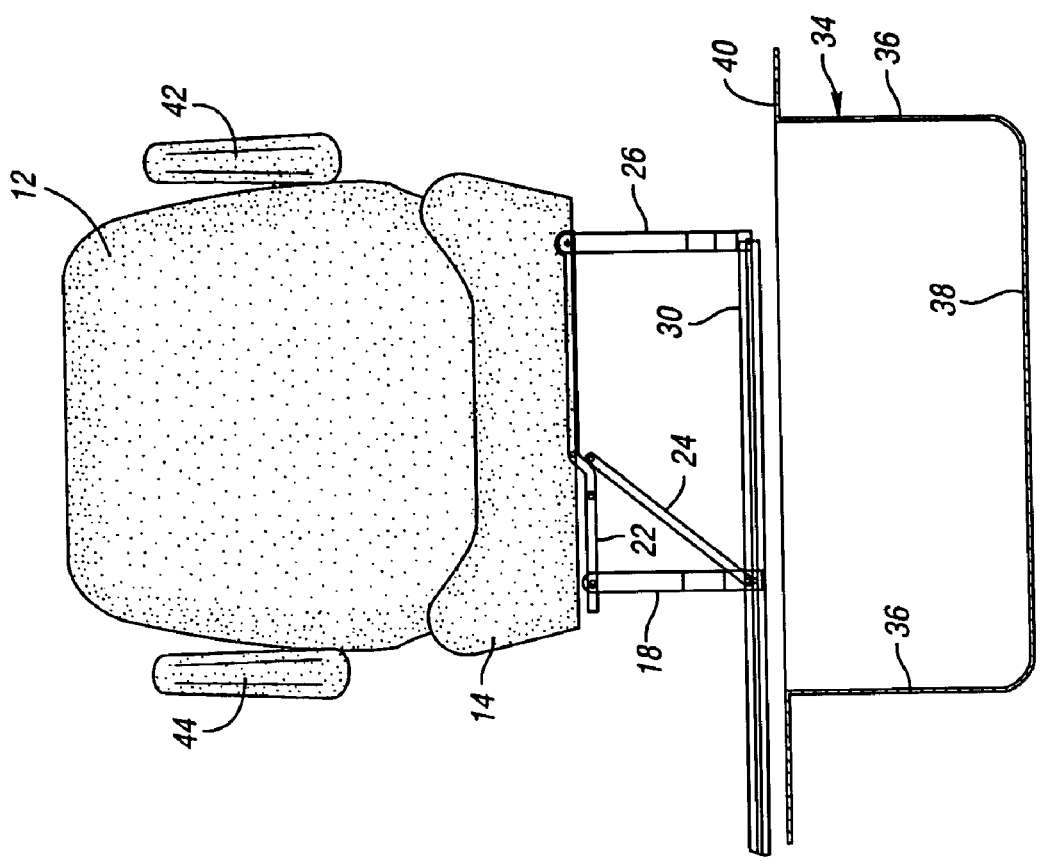
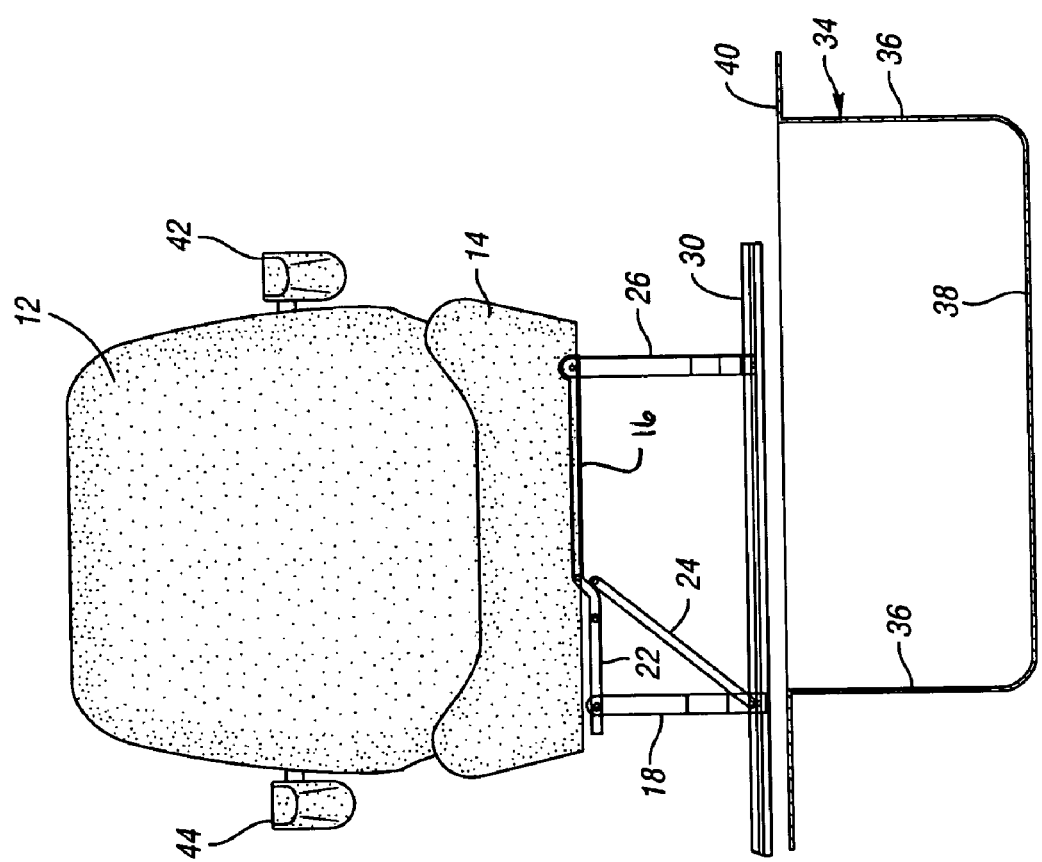

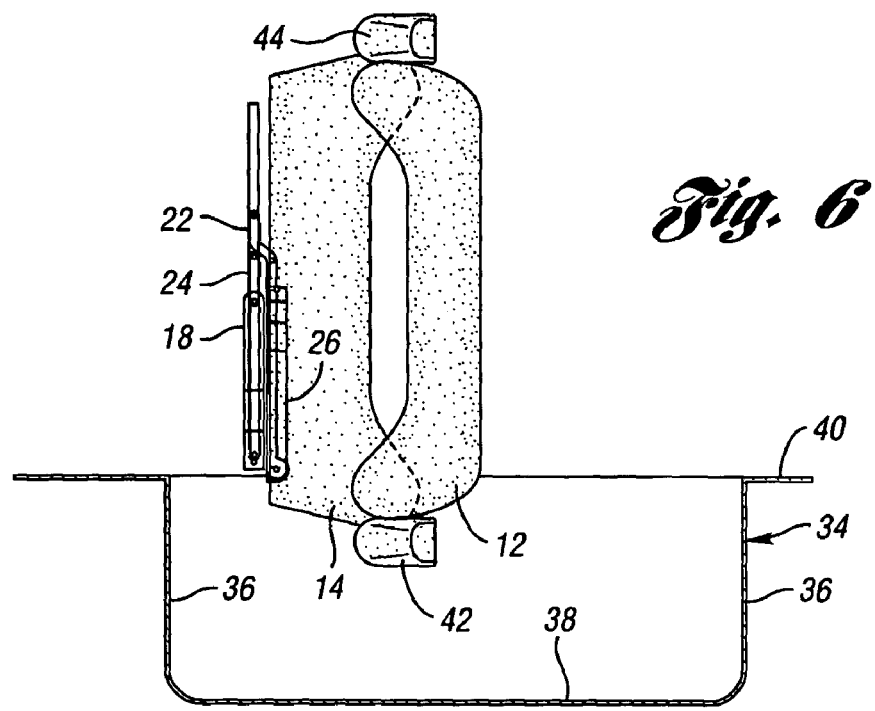

FOLD FLAT MOTOR VEHICLE SEAT

CROSS-REFERENCE TO RELATED APPLICATION(S)

This application claims the benefit of Provisional Patent Application No. 60/405,453, filed Aug. 23, 2002.

TECHNICAL FIELD OF THE INVENTION

This invention relates generally to seats for motor vehicle seats, and relates more specifically to a seat that folds to provide a flat surface.

BACKGROUND OF THE INVENTION

Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage. Typically, locking mechanisms are provided for holding the seat in the seating configuration, and the locking mechanisms can be released to permit moving the seat to the load floor configuration.

One example of such a design is U.S. Pat. No. 6,089,641, assigned to the assignee of the present invention and hereby incorporated by reference. This patent teaches a passenger vehicle seating arrangement in which the second and third row seats fold down to form a cargo carrying platform.

SUMMARY OF THE INVENTION

One aspect of the present invention is a seat assembly for a motor vehicle having a tub disposed at least partially in a floor of the vehicle. The seat assembly comprises a seat cushion translatable on at least one track to a position generally above the tub. The seat cushion is stowable in the tub.

Accordingly, it is an object of the present invention to provide a seat assembly of the type described above that can be moved to a seating configuration and to a load floor configuration.

Another object of the present invention is to provide an assembly of the type described above that is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a schematic front view of the seat assembly in the upright position.

FIG. 3 is a schematic front view of the seat assembly in a translated position.

FIG. 6 is a schematic front view of the seat assembly in a rotated-to-vertical position.

FIG. 7 is a schematic front view of the seat assembly in a rotated-past-vertical position.

FIG. 8 is a schematic front view of the seat assembly in a stowed position.

DETAILED DESCRIPTION OF THE PRESENTLY PREFERRED EMBODIMENTS

Figure 1:
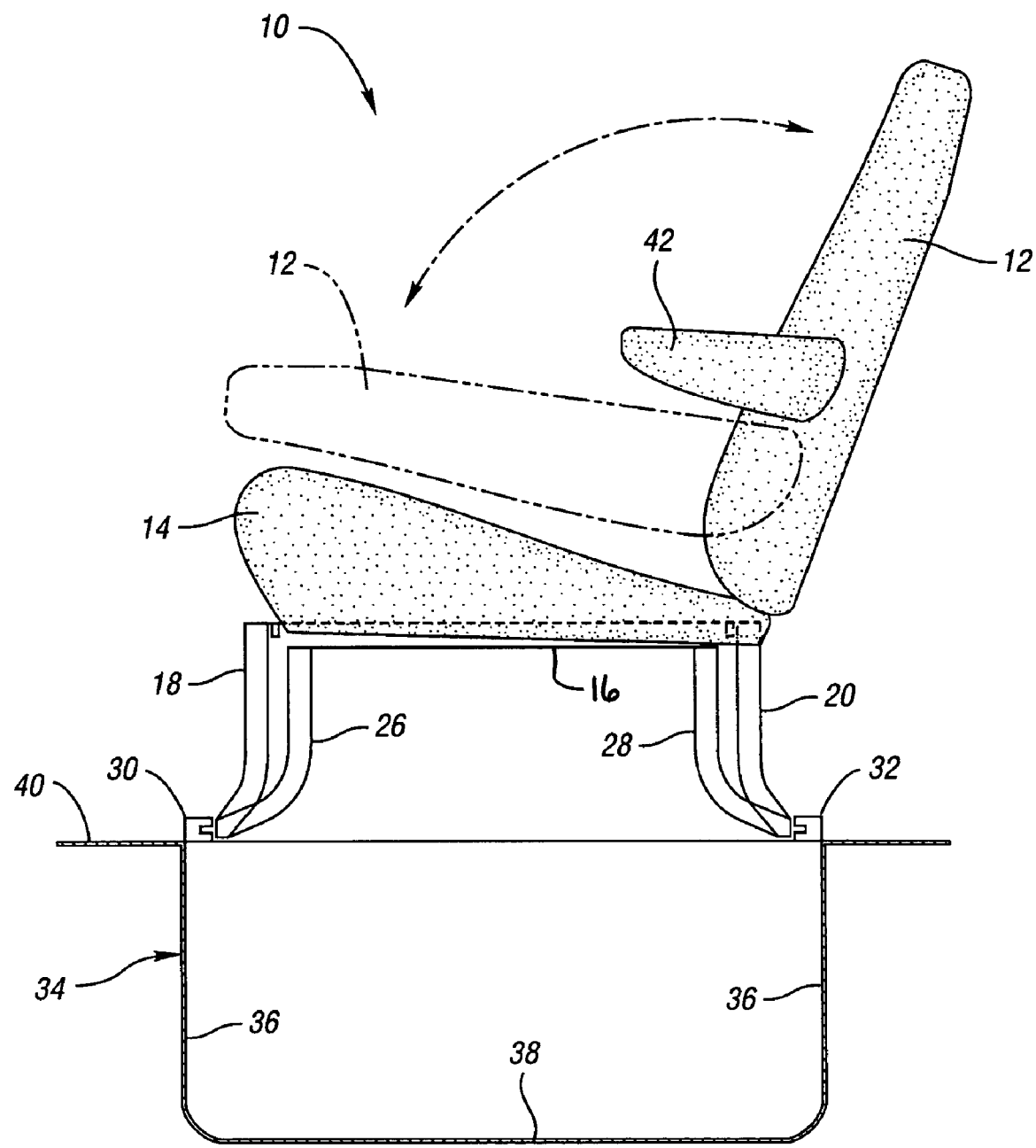
FIG. 1 is a schematic side view of a seat assembly according to the present invention in an upright, use position.

FIGS. 1 and 2 show one embodiment 10 of a seat assembly according to the present invention for a motor vehicle. The seat assembly 10 includes a seatback 12 and a seat cushion 14. The seatback 12 normally assumes a use position, as shown in FIGS. 1 and 2, in which the seatback 12 is generally upright in order to support the back of an occupant. As explained in greater detail below, the seatback 12 is pivotable in any known manner from the upright position toward positions more closely proximate the seat cushion 14, as shown in phantom in FIG. 1. The seat cushion 14 is mounted on a frame 16. A first pair of legs 18 and 20 are pivotably attached to a link 22 and a brace 24, which in turn are pivotably attached to the seat frame 16. A second pair of legs 26 and 28 are pivotably attached to the seat frame 16 proximate a normally outboard side of the seat assembly. At their opposite lower ends, the legs 18 and 20 are respectively slidably mounted in tracks 30 and 32 secured laterally across a floor of the vehicle, while the legs 26 and 28 are respectively slidably but removably mounted in the tracks 30 and 32.

As shown in FIG. 3, the seat assembly 10 may be released to slide side to side on the cross vehicle tracks 30 and 32. This allows, for instance, for adjacent seat assemblies to be brought together to create a bench-type arrangement. The ability of the seat assembly 10 to translate laterally in the vehicle also allows the seat assembly to be positioned over a seat tub 34. Each seat tub 34 is preferably formed from a composite-type material, with a minimum draft angle on its walls 36. A 30 millimeter layer of carpet and jute may be stacked up on the walls 36, and a layer of carpet only provided on the bottom 38 of the seat tub. The forward cross car track 30 may in the event of a sloping sheet metal floor 40 be positioned approximately 30 millimeters above the floor 40, with the rear track 32 preferably positioned at the height of the floor 40. In order to present a relatively level surface, the height of the carpet and jute stack-up on the floor of the vehicle may transition from the rear of the seat to the forward seat track 30.

Armrests 42 and 44 provided on either side of the seatback 12 are rotatable generally upwardly and inwardly to a stowed position as shown in FIG. 3. In a preferred embodiment, the armrests 42 and 44 rotate about 106 degrees between their use position and their stowed position, with the outboard armrest 42 translating inwardly about 51 millimeters and the inboard armrest 44 translating inwardly about 63 millimeters. It should be appreciated that a conventional seat back frame and seat foam arrangement may need to be modified to provide clearance for this translation, but such a modification is well within the ordinary skill in the art.

Figure 4:
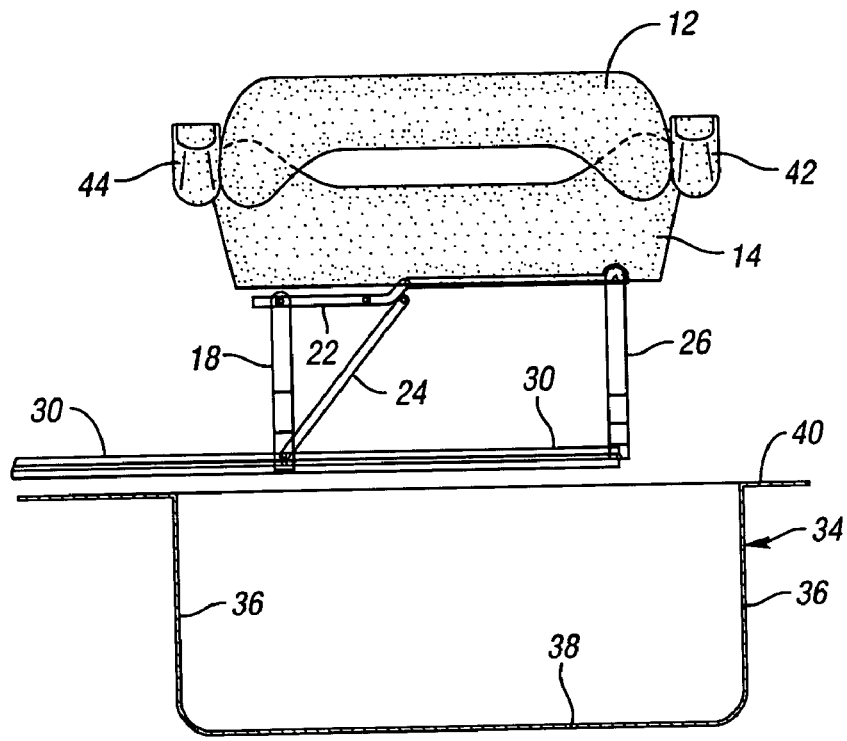
FIG. 4 is a schematic front view of the seat assembly with a seat back folded proximate a seat cushion.

The seatback 12 rotates in one embodiment approximately 104 degrees from the upright position to the position shown in FIG. 4, where the seatback lies against the seat cushion 14 to allow a more compressed package. Depending upon the particular application, this movement may involve the compression of foam, in some instances on the order of three inches. This seatback rotation may be induced in any acceptable manner, such as by the use of a release handle on the outboard side of the seat. It should be appreciated that the handle package should be within the profile of the seat cushion 14, or at least within the profile of the tub 34, so that the seat assembly may fit within the tub 34 as described below.

Figure 5:
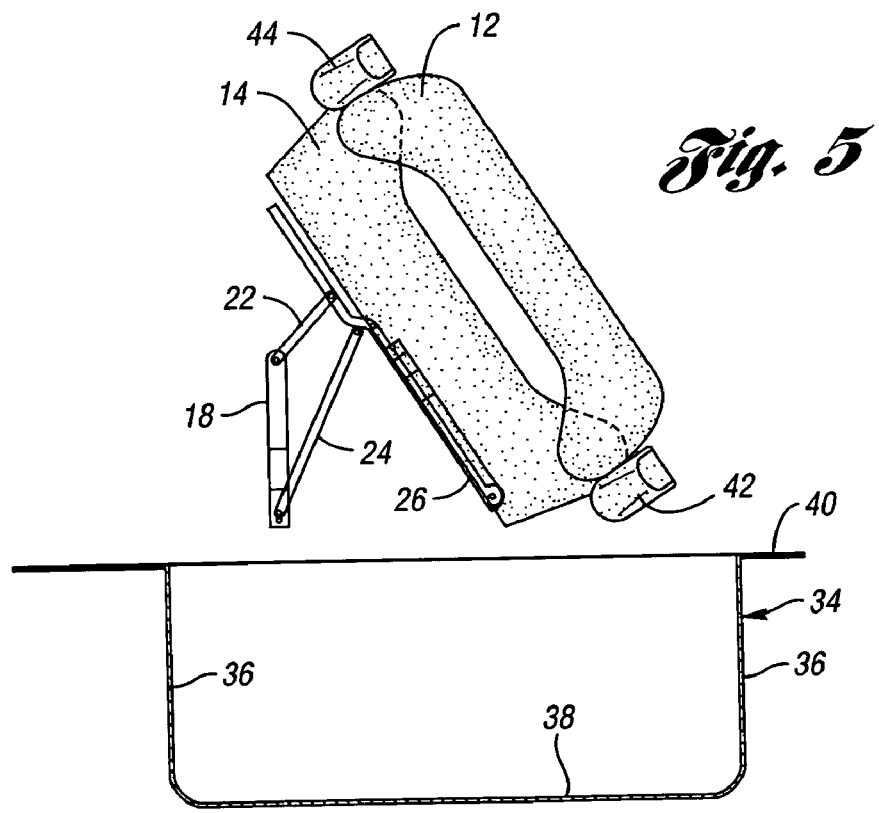
FIG. 5 is a schematic front view of the seat assembly in a partially rotated position.

The outboard legs 26 of the seat assembly are releasable from the tracks 30 and 32, and fold up ninety degrees against the underside of the seat cushion 14 to allow the seat assembly to be rotated into the position shown in FIG. 5. As is well known, a release handle (not shown) may be provided in a location such as under the seat cushion 14 in order to initiate a movement, such as the release of a pin from the tracks 30 and 32, to accomplish this rotation. Any such pin preferably stays in a retracted position while stowing the seat in order to clear its respective track 30 or 32. It should be appreciated that some tension may be needed in the inboard pivot components 22 and 24 to steady the seat.

FIGS. 6 and 7 show the seat assembly 10 as it is lowered into the tub 34. As can be seen, the outboard side of the seat assembly is lowered into the tub 34 before the inboard side of the seat assembly. At the same time, the pivot mechanism raises the inboard side of the seat assembly to a height above its normal height in use. In addition to or in lieu of the pivot components 22 and 24, a device such as a spring loaded hydraulic mechanism may be provided to assist the support of the seat assembly during its rotation from its use position toward its stowed position.

FIG. 8 shows the final motion of the seat assembly 10 into the tub 34. Tension may be provided in a lower pivot 46 in order to control rotation of the seat assembly. The underside of the seat cushion 14 may present the final load floor, which is preferably even with the floor 40 of the vehicle. Alternatively, a separate cover (not shown) may be provided for the seat assembly and tub 34.

The present invention thus provides a seat assembly that moves between a seating configuration and a configuration allowing the presentation of a relatively flat load floor. While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A seat assembly for a motor vehicle having a tub disposed at least partially in a floor of the vehicle, the seat assembly comprising:

a seat cushion translatable on at least one track to a position generally above the tub, the seat cushion being stowable in the tub wherein the at least one track is disposed generally laterally in the vehicle, and wherein the seat cushion is rotatable about an axis generally perpendicular to the at least one track.

2. A seat assembly for a motor vehicle having a tub disposed at least partially in a floor of the vehicle, the seat assembly comprising:

a seat cushion translatable on at least one track to a position generally above the tub, the seat cushion being stowable in the tub wherein the at least one track is disposed generally laterally in the vehicle;

at least one leg extending between the seat cushion and the at least one track, wherein the at least one leg is pivotably connected to the seat cushion.

3. The seat assembly of claim 2 wherein the at least one leg is releasably connected to the at least one track.

4. The seat assembly of claim 2 further comprising at least one second leg connected to the seat cushion, the at least one second leg being disposed inboard in the vehicle from the at least one leg.

5. The seat assembly of claim 2 wherein the seat cushion has an underside, and the underside presents a load floor when the seat cushion is stowed in the tub.

6. The seat assembly of claim 5 wherein the load floor is generally even with the floor of the vehicle.

7. The seat assembly of claim 2 wherein the seat cushion is rotatable about an axis generally perpendicular to the at least one track.

8. A seat assembly for a motor vehicle having a floor, the seat assembly comprising:

at least one track disposed generally laterally in the vehicle;

a tub disposed at least partially in the floor; and a seat cushion translatable on the at least one track to a position generally above the tub, the seat cushion being stowable in the tub; and at least one leg extending between the seat cushion and the at least one track; wherein the at least one leg is pivotably connected to the seat cushion.

9. The seat assembly of claim 8 wherein the at least one leg is releasably connected to the at least one track.

10. The seat assembly of claim 8 further comprising at least one second leg connected to the seat cushion, the at least one second leg being disposed inboard in the vehicle from the at least one leg.

* * * * *